(12) United States Patent
Lee

(10) Patent No.: US 10,876,463 B2
(45) Date of Patent: Dec. 29, 2020

(54) APPARATUS AND METHOD FOR CONTROLLING FLOW RATE OF ENGINE COOLANT BY USE OF A THERMOSTAT

(71) Applicants: HYUNDAI MOTOR COMPANY, Seoul (KR); KIA MOTORS CORPORATION, Seoul (KR)

(72) Inventor: Hyo-Jo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/451,251

(22) Filed: Jun. 25, 2019

(65) Prior Publication Data
US 2020/0158001 A1    May 21, 2020

(30) Foreign Application Priority Data
Nov. 21, 2018  (KR) .................... 10-2018-0144414

(51) Int. Cl.
| | |
|---|---|
| *F01P 7/16* | (2006.01) |
| *G05D 7/06* | (2006.01) |
| *F16K 31/00* | (2006.01) |
| *F01P 7/14* | (2006.01) |

(52) U.S. Cl.
CPC ............. *F01P 7/16* (2013.01); *F16K 31/002* (2013.01); *G05D 7/0635* (2013.01); *F01P 2007/146* (2013.01); *F01P 2025/04* (2013.01)

(58) Field of Classification Search
CPC .... F01P 7/16; F01P 7/161; F01P 7/165; F01P 2007/146; F01P 2025/04; F16K 31/002; G05D 7/0635
See application file for complete search history.

(56) References Cited

U.S. PATENT DOCUMENTS

| | | | | |
|---|---|---|---|---|
| 6,457,652 B1 * | 10/2002 | Fukamachi | ............... | F01P 7/16 236/34.5 |
| 6,460,492 B1 * | 10/2002 | Black | ........................ | F01P 3/20 123/41.1 |
| 2002/0189555 A1 * | 12/2002 | Murakami | ............... | F01P 3/20 123/41.1 |
| 2002/0195067 A1 * | 12/2002 | Murakami | ............... | F01P 3/20 123/41.1 |
| 2013/0263800 A1 * | 10/2013 | Lee | .......................... | F01P 7/16 123/41.08 |
| 2015/0144078 A1 * | 5/2015 | Hutchins | ................... | F01P 7/16 123/41.1 |

FOREIGN PATENT DOCUMENTS

KR            101338468 B1     12/2013

* cited by examiner

*Primary Examiner* — Jacob M Amick
(74) *Attorney, Agent, or Firm* — Lempia Summerfield Katz LLC

(57) ABSTRACT

An apparatus for controlling the flow rate of engine coolant by use of a thermostat may include a thermostat arranged in an inflow flow path for the engine coolant and a flow rate regulator arranged in a bypass flow path for the engine coolant between a cylinder head of an engine and the thermostat. The flow rate regulator regulates the flow rate of the bypass flow path such that a differential pressure of the coolant between a front end for allowing the coolant flowing from a radiator to flow into the thermostat and a rear end for allowing the coolant to be discharged from the thermostat is within a predetermined range.

11 Claims, 13 Drawing Sheets

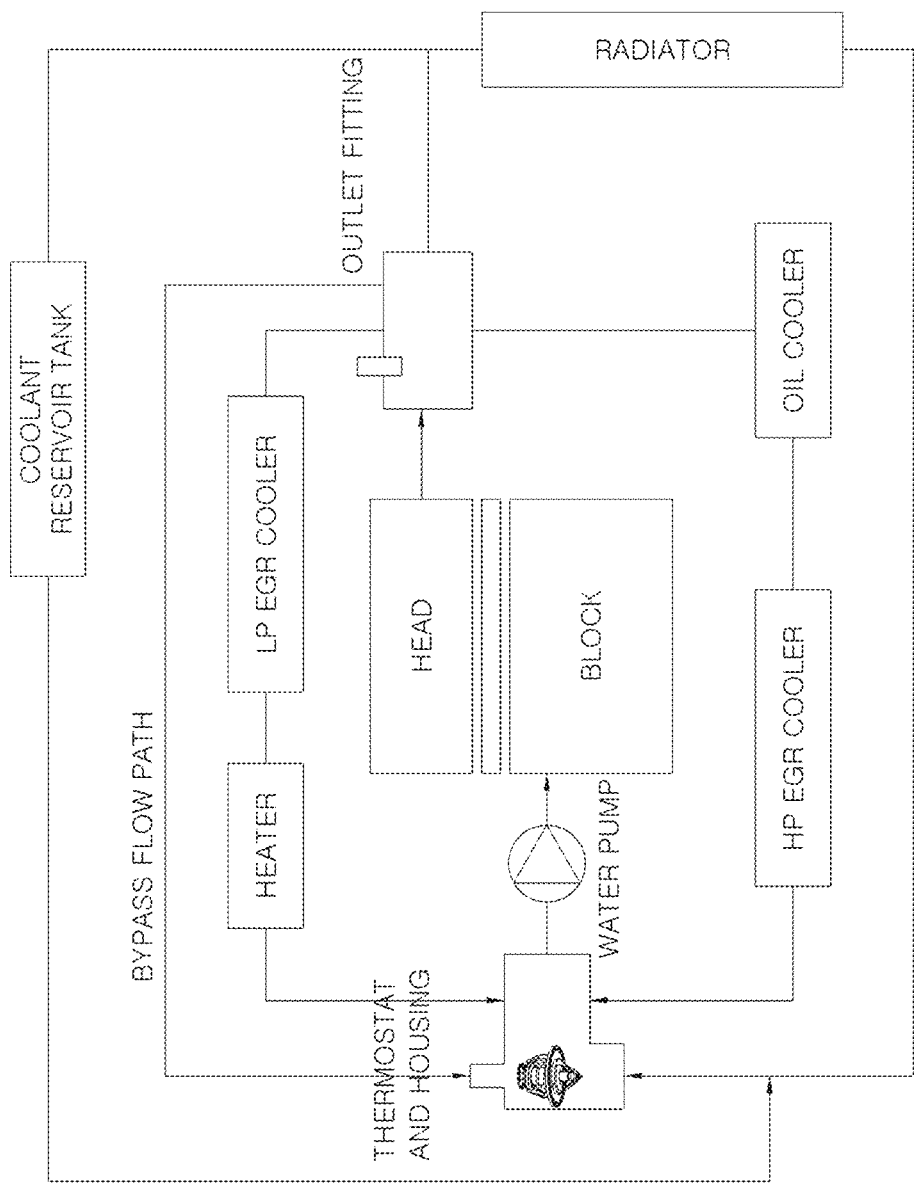

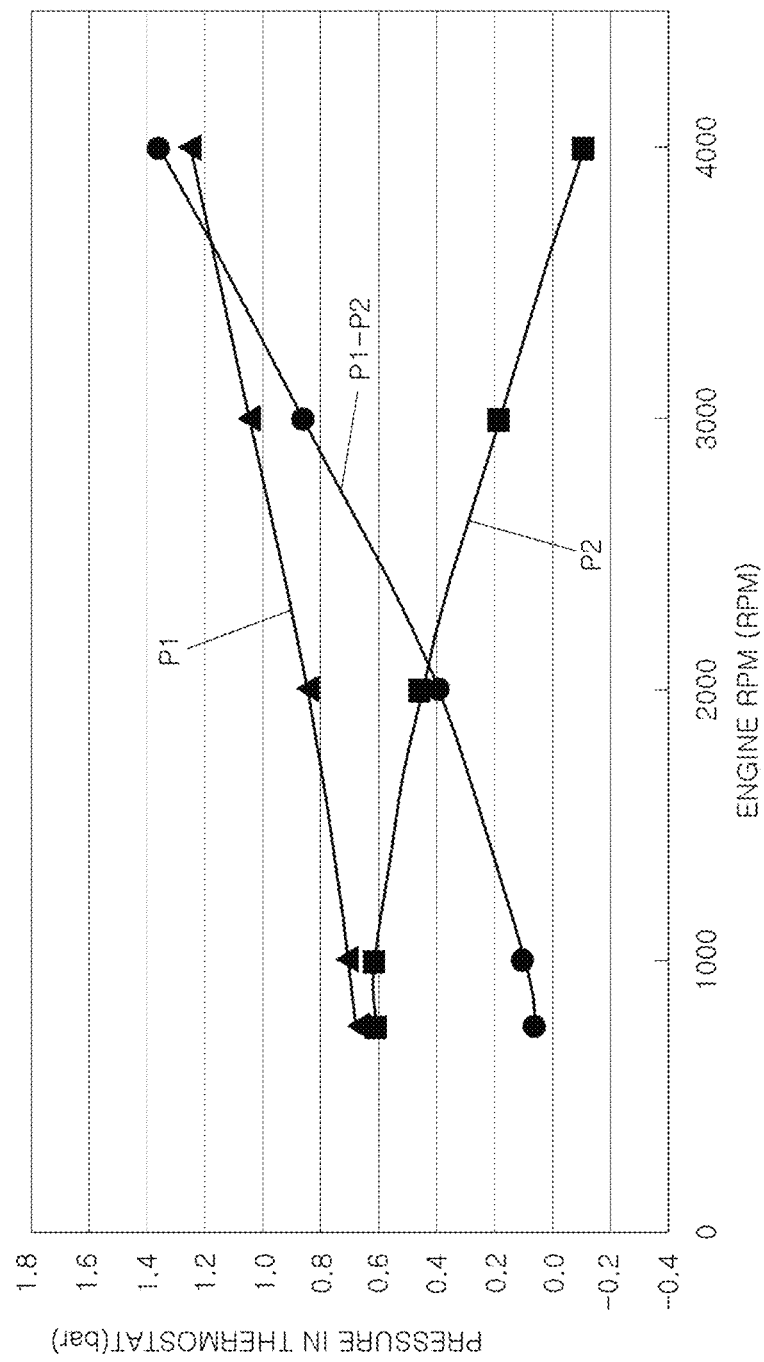

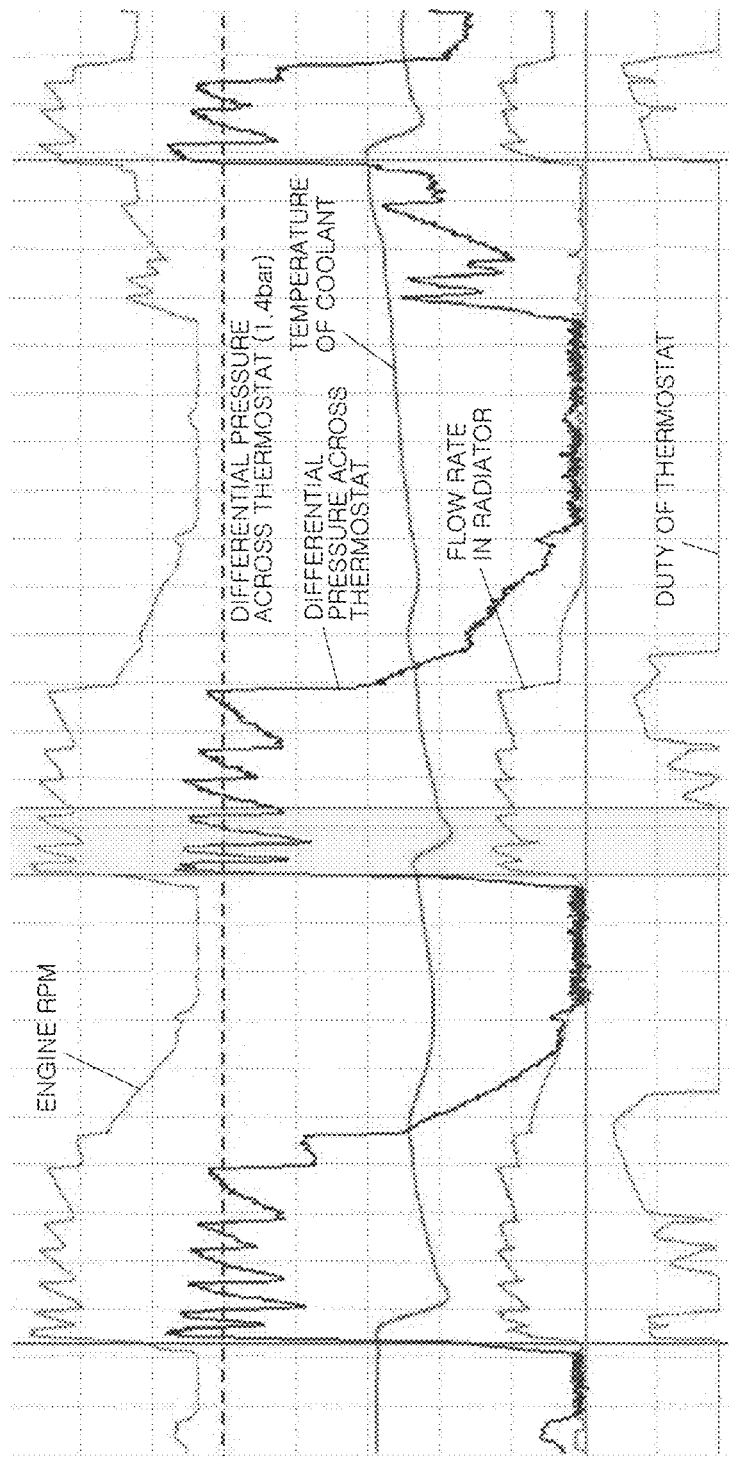

APPARATUS AND METHOD FOR CONTROLLING FLOW RATE OF ENGINE COOLANT BY USE OF A THERMOSTAT

CROSS-REFERENCE TO RELATED APPLICATIONS

This application claims priority to Korean Patent Application No. 10-2018-0144414, filed on Nov. 21, 2018, the disclosure of which is incorporated herein by reference in its entirety.

BACKGROUND OF THE DISCLOSURE

Field of the Disclosure

Embodiments of the present disclosure relate to an apparatus and a method for controlling the flow rate of engine coolant by use of a thermostat, and more particularly, to an apparatus and a method for controlling the flow rate of engine coolant that can prevent a thermostat from opening due to differential pressure of the coolant in the case of using a thermostat of an inlet control cooling mode.

Description of the Related Art

Thermostats are opened or closed depending on a set temperature of coolant, thereby controlling bypass flow rate circulating inside an engine of a vehicle and flow rate in a radiator. In the case of a general mechanical thermostat as shown in FIG. 3, as the wax inside of a wax casing 102 solidifies and shrinks or melts and expands, depending on the temperature of the coolant, a valve 101 moves up and down to open or close a flow path. In the case of such a mechanical thermostat, since opening and closing of the valve are controlled in response to the temperature of the coolant, active control of opening and closing of the flow path is impossible. On the contrary, in the case of an electronic thermostat as shown in FIG. 4 and disclosed in Korean Registered Patent No. 10-1338468, the thermostat is provided therein with an electric driven heater 207. The heater 207 is capable of heating the wax so that opening and closing of the flow path for the coolant can be actively controlled in response to operating conditions of the engine and environmental factors.

On the other hand, thermostats are divided into a thermostat of an outlet control mode and a thermostat of an inlet control mode according to the installation position of the thermostat. FIG. 7A shows an engine cooling system of an outlet control mode. In the outlet control mode, coolant heated by an engine flows into the thermostat from a cylinder head of the engine wherein a part of the introduced coolant is supplied to a radiator where it is cooled while a part of the introduced coolant is supplied back to a water pump along a bypass flow path. FIG. 8A shows an engine cooling system of an inlet control mode. In the inlet control mode, both coolant from the bypass flow path and coolant from the radiator are supplied to the thermostat wherein the thermostat regulates flow rate of the coolant to be supplied to the water pump.

The inlet control mode as disclosed in Korean Registered Patent No. 10-1338468 is advantageous in that a hunting phenomenon occurs less because the thermostat of the inlet control mode closely follows rapid change in temperature of the coolant and in that the temperature of the coolant can be controlled easily in response to a load of the engine. However, in the case of the inlet control mode, there is a problem in that, if differential pressure of the coolant between the inlet and outlet sides of the thermostat is high, a valve 101 is forcibly opened due to the pressure of the coolant.

As shown in FIG. 7B, in the case of the outlet control mode, a direction in which the valve 101 of the thermostat 100 is opened and a direction in which the valve 101 is pressed by the coolant being introduced by the thermostat are opposite to each other. Therefore, even if the differential pressure of the coolant is high, the valve 101 is not forcibly opened by the pressure of the coolant. However, in the case of the inlet control mode as shown in FIG. 8B, the direction in which the valve 101 of the thermostat 100 is opened and the direction in which the valve 101 is pressed by the coolant being introduced by the thermostat are the same as each other. Therefore, if the differential pressure of the coolant is high, the valve 101 is likely to be forcibly opened by the pressure of the coolant.

As shown in FIG. 9, as the revolutions-per-minute (RPM) of the engine increases, pressure P1 of the coolant at the inlet side of the thermostat increases whereas pressure P2 of the coolant at the outlet side of the thermostat decreases so that the differential pressure P1-P2 of the coolant in the thermostat increases. As a result, as can be seen from FIG. 10, when the RPM of the engine rapidly rises and thus the differential pressure P1-P2 of the coolant becomes 1.4 bar or more, the valve of the thermostat is forcibly opened and thus the coolant flows to the radiator even when control duty is not applied to the thermostat (that is, even when the thermostat is not controlled to be opened).

Particularly, if the thermostat is opened by the differential pressure of the coolant in a low-temperature and high-speed operation section, the coolant at low temperature circulates the engine, which causes problems such as deterioration of heating performance, delay of engine warm-up and deterioration of engine performance. Further, if a bypass flow path having relatively large diameter is applied in order to solve such problems, flow rate of the coolant circulating inside the engine becomes large even when the valve is not forcibly opened, which causes problems such as delay of engine warm-up occurs and flow rate of the coolant flowing to the parts requiring cooling, such as a heater, an oil cooler, and an exhaust gas recirculation (EGR) cooler, becomes small.

SUMMARY OF THE DISCLOSURE

The present disclosure is made to solve problems associated with the prior art as described above. An object of the present disclosure is to provide an apparatus and a method for controlling the flow rate of engine coolant that can prevent a valve from opening forcibly by differential pressure of the coolant even in a thermostat of an inlet control mode.

Other objects and advantages of the present disclosure can be understood by the following description and become apparent with reference to the embodiments of the present disclosure. Also, it should be apparent to those having ordinary skill in the art to which the present disclosure pertains that the objects and advantages of the present disclosure can be realized by the apparatus and method as claimed and combinations thereof.

In accordance with one aspect of the present disclosure, an apparatus is provided for controlling the flow rate of engine coolant by use of a thermostat. The apparatus comprises a thermostat arranged in an inflow flow path for the engine coolant and a flow rate regulator arranged in a bypass flow path for the engine coolant between a cylinder head of an engine and the thermostat. The flow rate regulator regulates the flow rate of the bypass flow path such that differential pressure of the coolant between a front end for allowing the coolant flowing from a radiator to flow into the thermostat and a rear end for allowing the coolant to be discharged from the thermostat is within a predetermined range.

In one example, the flow rate regulator may be a hole size varying mechanism for variably adjusting a cross-sectional area of the bypass flow path.

The hole size varying mechanism may comprise a spool cavity formed in an inner wall of the bypass flow path and a spool capable of moving linearly forward and backward along a longitudinal direction of the spool cavity. The hole size can be varied by the forward and backward linear movement of the spool.

The hole size varying mechanism may further comprise a valve spring mounted inside the spool cavity to apply spring force to a front end of the spool to be inserted into the spool cavity.

In order for the hole size varying mechanism to be controlled to automatically open and close by pressure of the coolant flowing from the radiator, a second bypass flow path extending between a flow path for the coolant flowing into the thermostat and the bypass flow path is formed. A distal end of the spool of the hole size varying mechanism is also mounted in the second bypass flow path such that the spool is pressed toward the spool cavity by pressure of the coolant flowing into the second bypass flow path.

In one example, a stopper for limiting the range in which the distal end of the spool is inserted into the inside of the second bypass flow path is provided in the second bypass flow path.

In one example, the thermostat may comprise a first flow path connected to the radiator, a second flow path connected to a water pump, and a third flow path connected to the bypass flow path.

In one example, the thermostat to be applied to embodiments of the present disclosure may be an electronic thermostat having a confluence space formed inside thereof to be connected to the first, second, and third flow paths and having a valve body mounted in the confluence space. A drive valve arranged to open and close the flow path of the coolant, a spring for elastically supporting a lower end of the drive valve in an upward direction, and an electric-driven heater for applying heat to wax to drive the drive valve may be comprised in the inside of the valve body.

In one example, the thermostat to be applied to embodiments of the present disclosure may be a mechanical thermostat configured to open and close the flow path of the coolant by expanding force of the wax contracting or expanding depending on temperature of the coolant.

In one example, in order to prevent the valve from being forcibly opened by differential pressure of the coolant, the flow rate regulator may be configured to regulate bypass flow rate such that the differential pressure of the coolant is 1.4 bar or less.

In one example, the flow rate regulator may be a flow rate control valve for controlling flow rate of the coolant in the bypass flow path in response to a result of measurement of a coolant differential pressure sensor.

In one example, the flow rate regulator may be an integrated flow rate control valve for integratedly controlling a plurality of coolant flow paths. The integrated flow rate control valve may control the flow rate of the coolant in the bypass flow path as one of the plurality of coolant flow paths in response to a result of measurement the coolant differential pressure sensor.

In accordance with another aspect of the present disclosure, a method is provided for controlling the flow rate of coolant flowing into an engine by use of a thermostat arranged in a coolant inflow flow path of the engine. The method comprises regulating a bypass flow rate of the coolant between a cylinder head of the engine and the thermostat such that differential pressure of the coolant between a front end for allowing the coolant flowing from a radiator to flow into the thermostat and a rear end for allowing the coolant to be discharged from the thermostat is within a predetermined range.

The apparatus and the method for controlling flow rate of engine coolant according to the present disclosure make it possible to solve the problem that the thermostat is forcibly opened by differential pressure of the coolant when the coolant is at a low temperature and the engine is in the high-speed operation range.

According to the present disclosure, there is no need to provide a large-diameter bypass hole in order to solve the problem caused by the differential pressure of the coolant, so that it is advantageous in terms of cooling efficiency.

According to the present disclosure, it is possible to improve negative pressure at an inlet of the water pump by adjusting the bypass flow rate, thereby preventing occurrence of cavitation in the water pump.

According to the present disclosure, it is possible to actively regulate the bypass flow rate in response to operating conditions of the engine and external environmental conditions so that it is efficient in terms of distribution of flow rate of the engine coolant.

According to the present disclosure, it is possible to appropriately control fluctuation in circulation pressure of the engine coolant, thereby improving durability of parts associated with the engine.

Moreover, according to the present disclosure, the bypass flow rate can be appropriately controlled regardless of whether a thermostat to be applied is a mechanical or electronic thermostat.

It is to be understood that both the foregoing general description and the following detailed description of the present disclosure are by way of example and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIGS. 8A and 8B are, respectively, a diagram for explaining a cooling system of an inlet control mode and a diagram illustrating flow of coolant in a thermostat of an inlet control mode;

FIG. 9 is a graph plotting change in pressure of coolant passing through a thermostat depending on the RPM of an engine; and FIG. 10 is a graph plotting change in flow rate of coolant flowing into a radiator depending on differential pressure of the coolant.

DESCRIPTION OF SPECIFIC EMBODIMENTS

Embodiments of the present disclosure are described below in detail with reference to the accompanying drawings.

Figure 1:
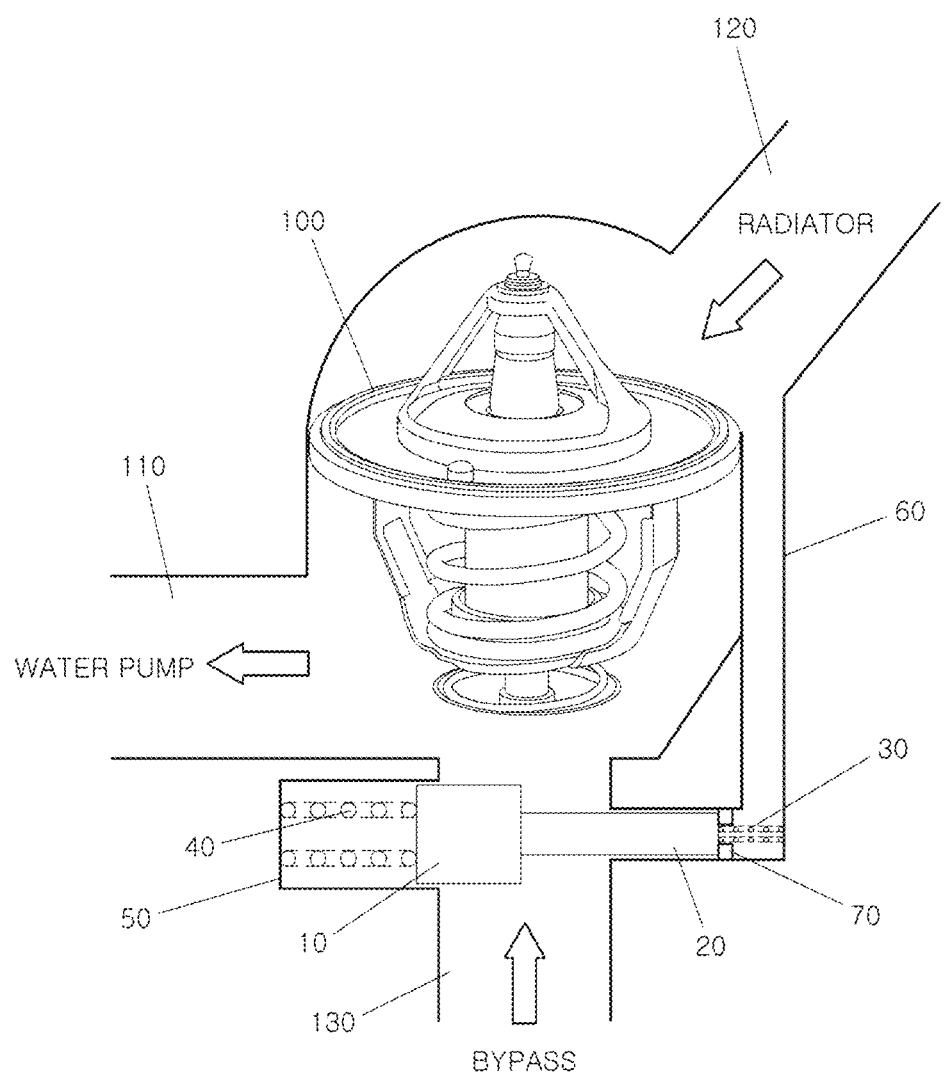
FIG. 1 is a schematic constitution diagram of an apparatus for controlling flow rate of engine coolant according to an embodiment of the present disclosure.
Figure 8B:
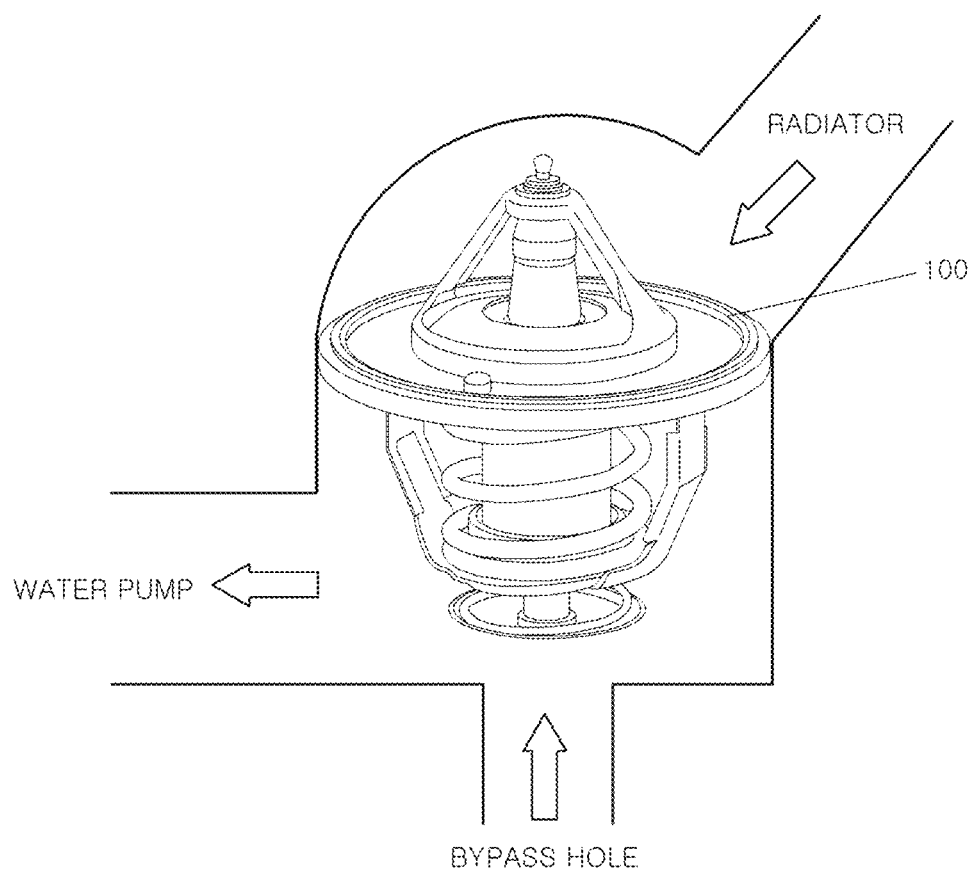

FIG. 1 is a schematic constitution diagram of an apparatus for the controlling flow rate of engine coolant according to an embodiment of the present disclosure. FIG. 8A is a diagram for explaining a cooling system of an inlet control mode, to which an apparatus for controlling the flow rate of engine coolant according to an embodiment of the present disclosure.

As shown in the figures, in the cooling system to which a thermostat 100 of an inlet control mode is applied, the thermostat 100 is installed in a coolant inflow flow path that leads to an engine composed of a cylinder block and a cylinder head. More specifically, the coolant cooled by a radiator flows into the thermostat 100 through a first flow path 120 and the coolant flowing from the thermostat 100 is supplied to a water pump through a second flow path 110. The coolant supplied to the water pump is then supplied to the engine composed of the cylinder block and the cylinder head.

In addition, in the apparatus for controlling the flow rate of engine coolant according to the embodiment of the present disclosure, a bypass hole 130 for allowing the coolant to flow into the thermostat 100 through a bypass flow path configured such that the coolant heated during passing through the engine is returned to the water pump. The coolant introduced into the thermostat 100 through the bypass hole 130 passes through the thermostat and then flows into the water pump through the second flow path 110.

In the cooling system configured as described above, when differential pressure P1-P2, which is a difference between the pressure P1 of the coolant flowing from the radiator through the first flow path 120 and the pressure P2 of the coolant flowing into the water pump through the second flow path 110, becomes large, the differential pressure of the coolant acts on a valve 101 to force the valve 101 to be opened. If a bypass flow path having large diameter is provided to prevent such a situation, the flow rate of the coolant flowing to the bypass flow path increases even when the differential pressure of the coolant is not high. As a result, cooling efficiency is significantly deteriorated.

Therefore, in the apparatus for controlling the flow rate of engine coolant according to the embodiment of the present disclosure, a flow rate regulator is provide for regulating a flow rate of the bypass flow path such that the differential pressure of the coolant is within a predetermined range within which the valve is not forcibly opened. According to the embodiment of present disclosure, the flow rate flowing through the bypass flow path is controlled in such a manner that when the differential pressure of the coolant is large, the flow rate flowing through the bypass flow path is increased to reduce the differential pressure acting on the valve 101 of the thermostat 100. In addition, when the differential pressure of the coolant is not large, the flow rate flowing through the bypass flow path is reduced to allow a sufficient amount of coolant to flow into a heater core, the engine and the radiator.

The apparatus for controlling the flow rate of engine coolant according to the embodiment shown in FIG. 1, a regulator is provided for regulating the flow rate of the coolant flowing through the bypass flow path. For example, the regulator may be a hole size varying mechanism for variably controlling cross-sectional area of the bypass hole 130.

In this case, the hole size varying mechanism comprises a spool cavity 50 formed in an inner wall of the bypass flow path and a spool 10 capable of moving linearly forward and backward along a longitudinal direction of the spool cavity 50. A part of the front end of the spool 10 is inserted into the spool cavity 50 while a part thereof is exposed to the bypass flow path. Therefore, the hole size of the bypass flow path is reduced as the part inserted into the spool cavity 50 is exposed to the outside by the backward linear movement of the spool 10, whereas the hole size is increased as the part exposed to the outside is reduced while the spool 10 is inserted into the spool cavity 50 by the forward linear movement of the spool 10. In one example, a valve spring 40 is arranged in the spool cavity 50 such that a spring force is applied to the front end of the spool 10.

The spool 10 may perform the forward and backward linear movement by a driving unit that drives the spool 10 in response to a result of measurement of a coolant differential pressure sensor (not shown). In the embodiment shown in FIG. 1, however, the spool is configured to perform the forward and backward linear movement by means of pressure of the coolant without any electric driving means such as a separate measuring sensor or an electric motor.

To this end, a second bypass flow path 60 is formed between the first flow path 120 through which the coolant flowing from the radiator flows into the thermostat 100 and the bypass flow path 130 wherein a distal end 20 of the spool 10 is inserted into the second bypass flow path 60. In this case, a part of the coolant flowing from the radiator through the first flow path 120 flows into the second bypass flow path 60 and the coolant flowing into the second bypass flow path 60 applies pressure to the distal end 20 of the spool 10. Here, the pressure applied to the distal end of the spool 20 by the coolant flowing into the second bypass flow path 60 is proportional to the pressure P1 of the coolant flowing from the radiator to the thermostat 100.

Figure 2A:
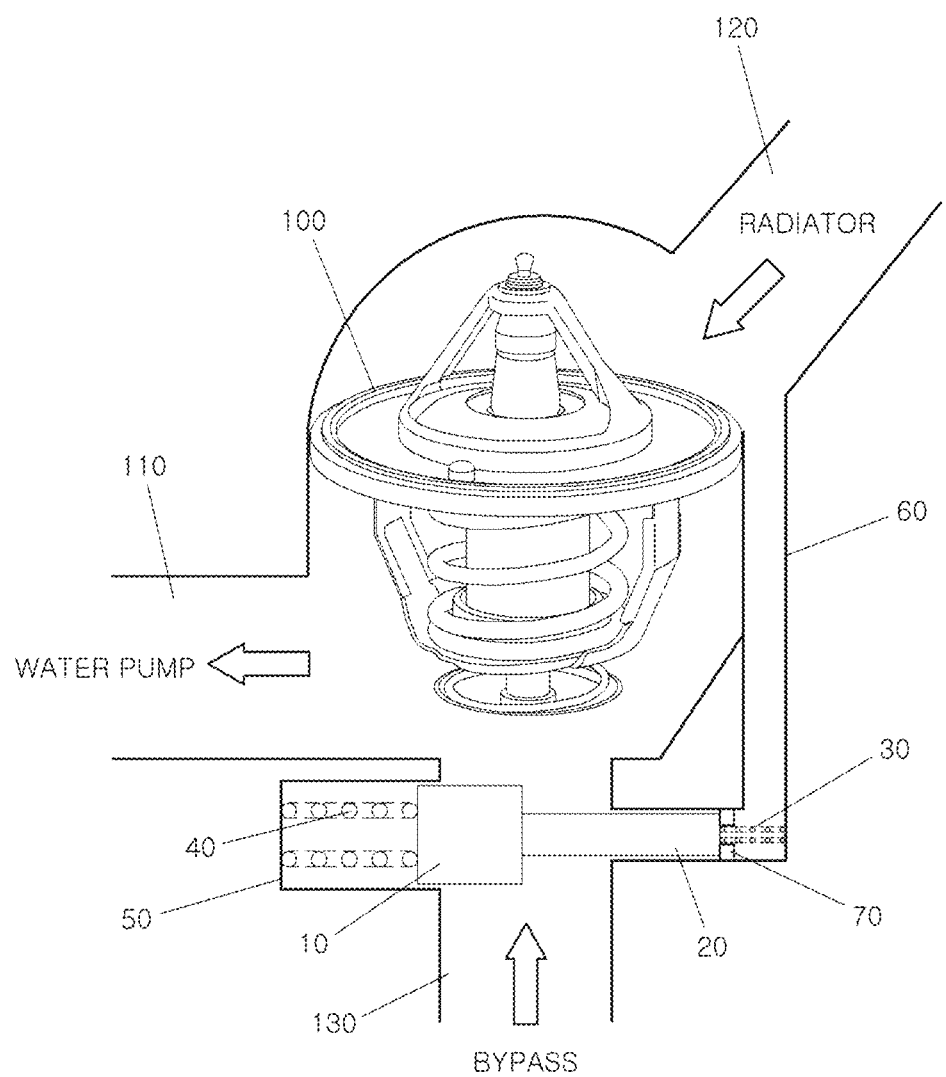
FIGS. 2A and 2B are diagrams for explaining operation of the apparatus for controlling flow rate of engine coolant shown in FIG. 1.

As shown in FIG. 2A, when the pressure of the coolant flowing from the radiator is low, the pressure applied to the distal end 20 of the spool 10 by the coolant flowing through the second bypass flow path 60 is also lowered so that the spring force of the valve spring 40 becomes higher than the pressure applied to the distal end 20 of the spool 10. Accordingly, the spool 10 moves linearly far from the spool cavity 50 by the spring force of the valve spring 40 and as a result, the hole size of the bypass flow path decreases.

Figure 2B:
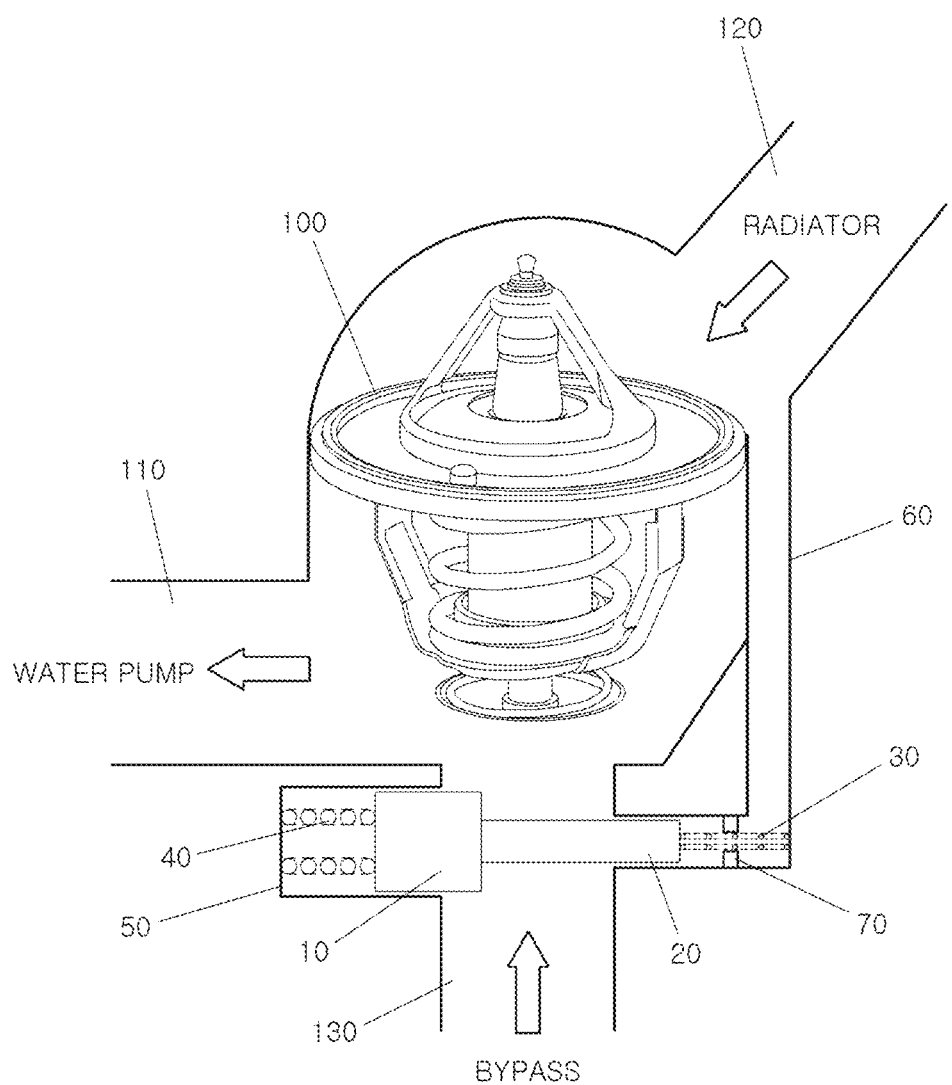

In addition, as shown in FIG. 2B, when the pressure of the coolant flowing from the radiator becomes high, the pressure applied to the distal end 20 of the spool 10 by the coolant flowing through the second bypass flow path 60 also becomes high. Thus, when the pressure applied to the distal end 20 of the spool 10 becomes higher than the spring force of the valve spring 40, the spool 10 is forced to move toward the spool cavity 50. As a result, the hole size of the bypass flow path increases.

Moreover, in one example the second bypass passage 60 is provided with a second valve spring 30 capable of pressing the distal end 20 of the spool 10 toward the spool cavity 50. The amount of forward and backward linear movement of the spool 10 may be limited appropriately by means of the spring force applied to the distal end 20 of the spool 10 by the second valve spring 30.

Further, a stopper 70 is provide in the second bypass flow path 60 for limiting the range in which the distal end 20 of the spool 10 is inserted into the inside of the second bypass flow path 60. The provision of the stopper 70 makes it possible to prevent the cross-sectional area of the bypass flow path 130 from being excessively narrowed due to movement of the spool 10 beyond an appropriate range.

According to the embodiment shown in FIG. 1, it is possible to automatically vary the hole size without any measuring means for measuring the differential pressure of the coolant between the inlet and outlet sides of the thermostat and without any electric driving mechanism for precisely controlling the hole size varying mechanism.

On the other hand, as described above, when the differential pressure of the coolant is 1.4 bar or more, the valve is forcibly opened by the differential pressure of the coolant. Therefore, the bypass flow rate is required to be adjusted to be less than 1.4 bar. Consequently, the shape of the spool 10, the cross-sectional area of the second bypass passage 60, and the spring force of the valve springs 40 and 30 are required to be determined such that the differential pressure of the coolant is maintained within the range as mentioned above.

In the apparatus for controlling flow rate of engine coolant according to an embodiment of the present disclosure, it is possible to use not only a mechanical thermostat but also an electronic thermostat.

Figure 3:
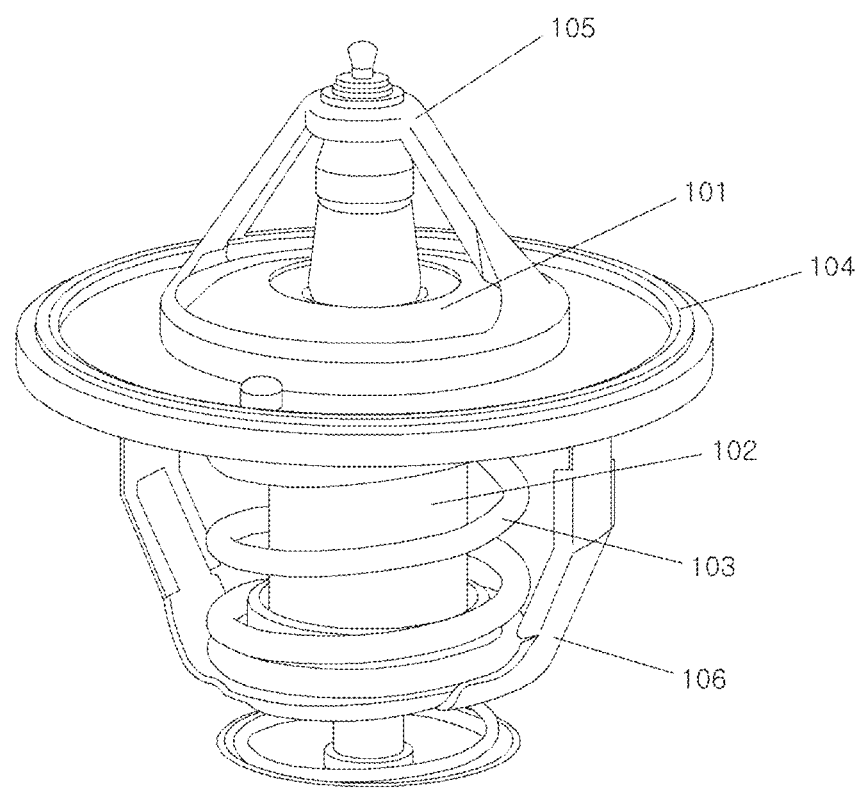
FIG. 3 is a diagram illustrating a mechanical thermostat applicable to an apparatus for controlling flow rate of engine coolant according to an embodiment of the present disclosure.

FIG. 3 illustrates an example of a mechanical thermostat applicable to the apparatus for controlling the flow rate of engine coolant according to an embodiment of the present disclosure.

The mechanical thermostat includes an upper frame member 105 and a lower frame member 106 with a valve seat 104 interposed therebetween. The lower frame member 106 is provided with a thermosensitive member 102 having a valve body 101 at one end. The thermosensitive member 102 is composed of a pellet or the like that contracts or expands depending on change in temperature. In addition, a valve spring 103 is arranged between the valve body 101 and the lower frame member 106 to elastically press the valve body 101 toward the valve seat 104.

According to the mechanical thermostat as described above, when the temperature of the coolant flowing into the thermostat is low, the thermosensitive member 102 does not expand so that the valve spring 103 forces the valve body 101 to be pressed against the valve seat 104 and thus the flow path formed in the valve seat 104 is closed. On the other hand, when the temperature of the coolant flowing into the thermostat is high, the thermosensitive member 102 starts to expand so that the valve body 101 moves far from the valve seat 104 and thus the flow path formed in the valve seat 104 is opened. The mechanical thermostat shown in FIG. 3 is merely an example and any mechanical thermostat using a conventional thermosensitive member is applicable to the embodiments of the present disclosure.

Figure 4:
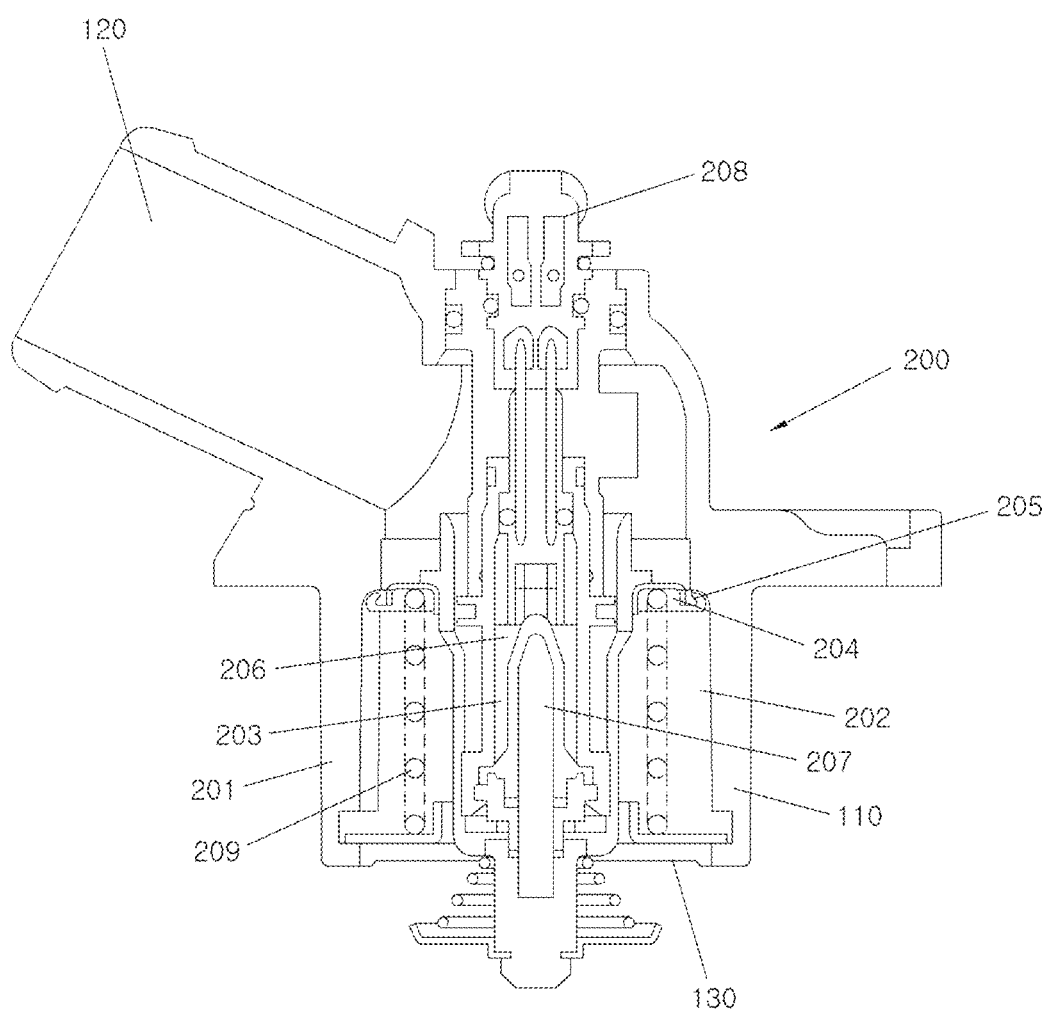
FIG. 4 is a diagram illustrating an electronic thermostat applicable to an apparatus for controlling flow rate of engine coolant according to an embodiment of the present disclosure.

It is natural that, in addition to the mechanical thermostat as mentioned above, an electronic thermostat can be used in the apparatus for controlling the flow rate of engine coolant according to the present disclosure. FIG. 4 illustrates an example of an electronic thermostat applicable to the apparatus for controlling flow rate of engine coolant according to an embodiment of the present disclosure.

The thermostat 200 comprises a thermostat casing 201. The thermostat casing 201 is formed with a first flow path 120 connected to a radiator, a second flow path 110 connected to a water pump, and a bypass flow path 130.

A confluence space 202 connected to the first flow path 120 and the second flow path 110 and the bypass flow path 130 is formed in the thermostat casing 201 and a valve body 203 is mounted in the confluence space 202. In addition, a drive valve 204 for selectively blocking the first flow path 120 is integrally formed at an upper end of the valve body 203. A main spring 209 is arranged inside the thermostat casing 201. An upper end of the main spring 209 elastically supports a lower end of the drive valve 204 in an upward direction while a lower end of the main spring 209 is supported inside the casing 201. In one example, an additional valve is provided at a lower portion of a main piston 207 of the valve body 203 to control opening and closing of the bypass flow path 130.

Wax 206 as a thermosensitive member is disposed in or fills the valve body 203 and an electric-driven heater 207 is arranged inside the wax to heat the wax 206 using electric current supplied through a connector 208.

The electronic thermostat 200, similarly to the mechanical thermostat, can control the flow rate of the coolant flowing through the respective flow paths by operating the drive valve 204 by means of contraction or expansion of the wax 206 depending on temperature of the coolant. Furthermore, in the electronic thermostat 200, even when the temperature of the coolant does not reach a predetermined temperature, the driving valve 204 can be driven quickly by applying electric power to the electric-driven heater 207 to heat the wax 206.

FIGS. 1 and 2 illustrate an embodiment of the apparatus for controlling flow rate of engine coolant that includes the hole size varying mechanism for controlling the flow rate of the bypass flow path. However, the present disclosure is not limited to this embodiment.

Figure 5:
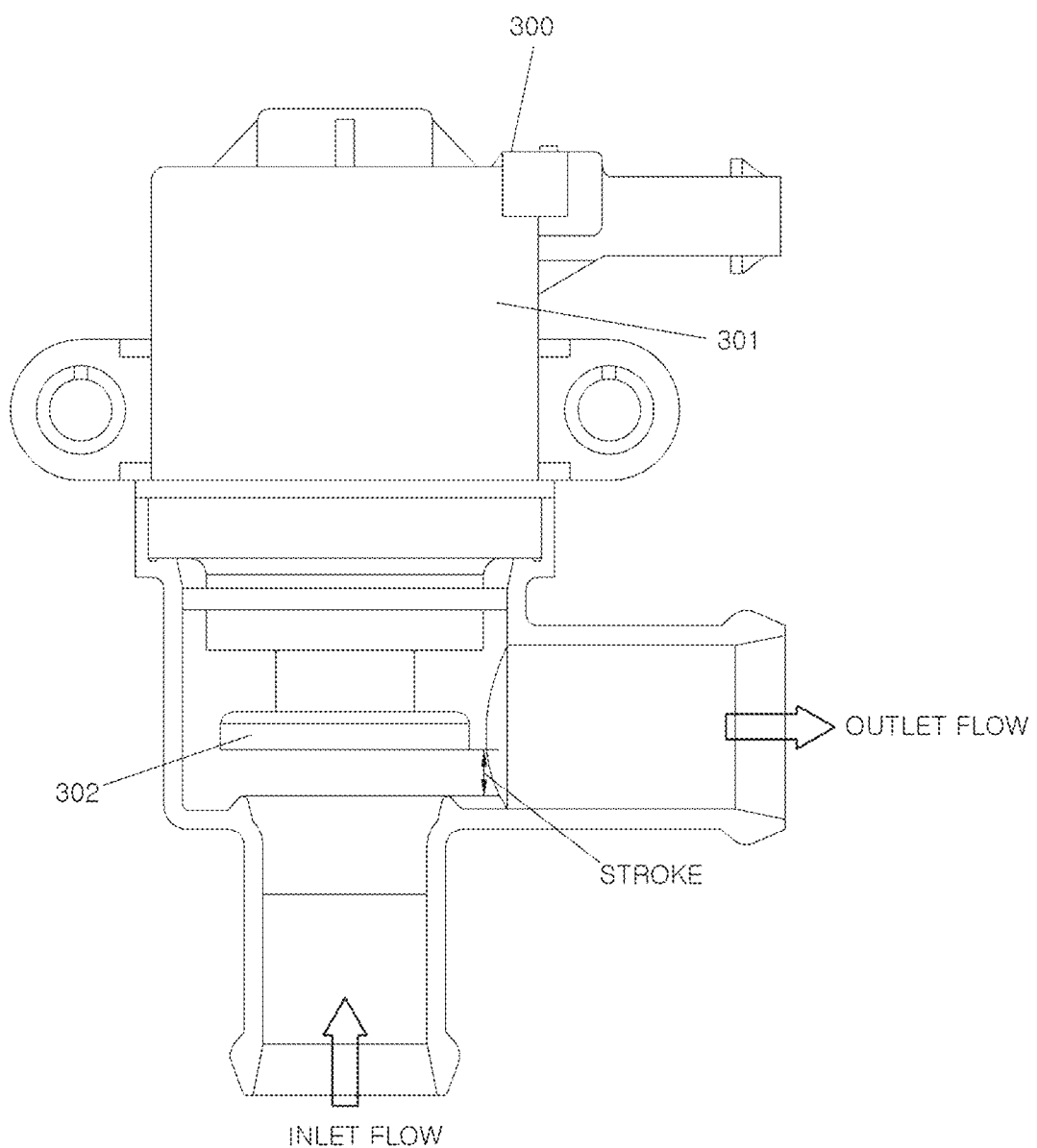
FIG. 5 is a diagram illustrating a flow rate control valve applicable to an apparatus for controlling flow rate of engine coolant according to an embodiment of the present disclosure.

In one example, the bypass flow path 130 is provided with a flow rate control valve 300 as shown in FIG. 5 instead of having the hole size varying mechanism. The flow rate control valve 300 can control the stroke of a plunger 302 using a driving unit 301 such as an electric motor to adjust the flow rate of the coolant flowing into the thermostat through the bypass flow path 130. In this embodiment, it is necessary to provide a pressure measurement sensor in the first flow path 120 and the second flow path 130. In this case, differential pressure of the coolant in the thermostat can be derived from pressure values measured by the pressure measurement sensor. Also, an opening degree of the flow rate control valve 300 is controlled in such a manner that the differential pressure is within a predetermined range.

Figure 6:
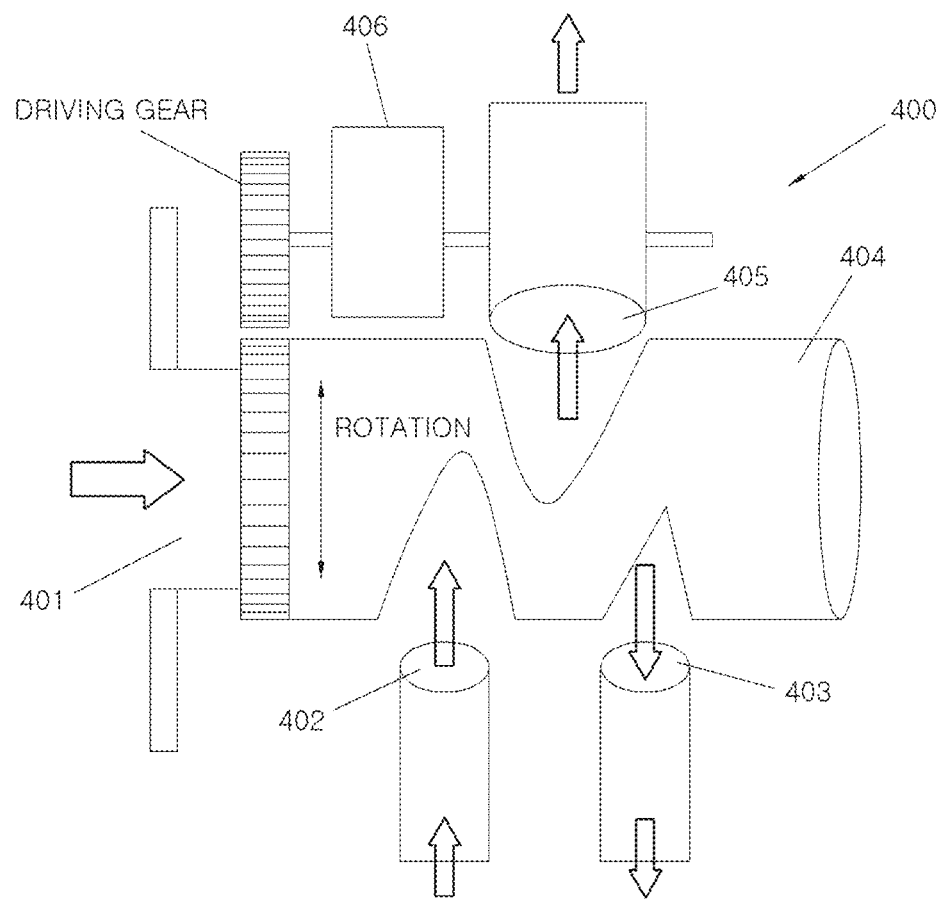
FIG. 6 is a section view illustrating an integrated flow rate control valve applicable to an apparatus for controlling flow rate of engine coolant according to an embodiment of the present disclosure.
Figure 7A:
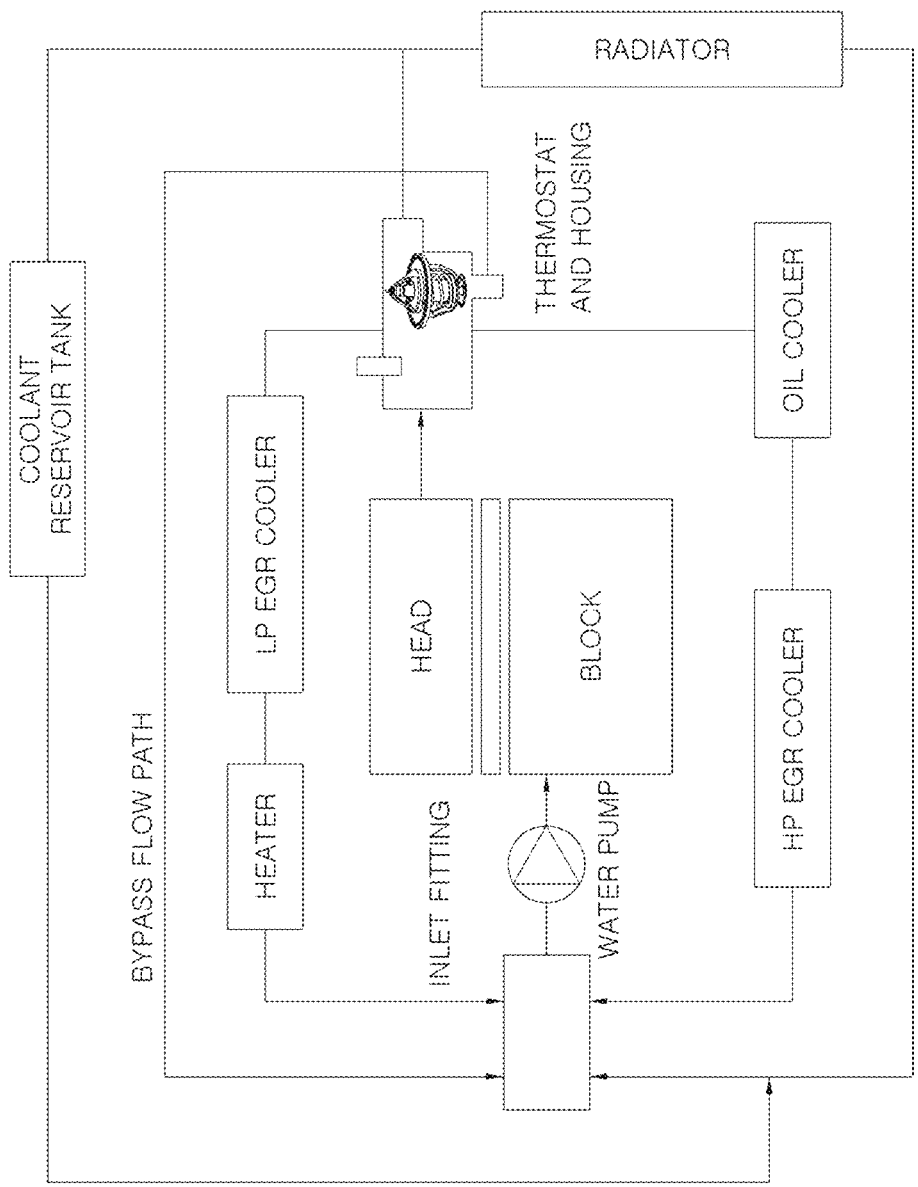
FIGS. 7A and 7B are, respectively, a diagram for explaining a cooling system of an outlet control mode and a diagram illustrating flow of coolant in a thermostat of an outlet control mode.
Figure 7B:
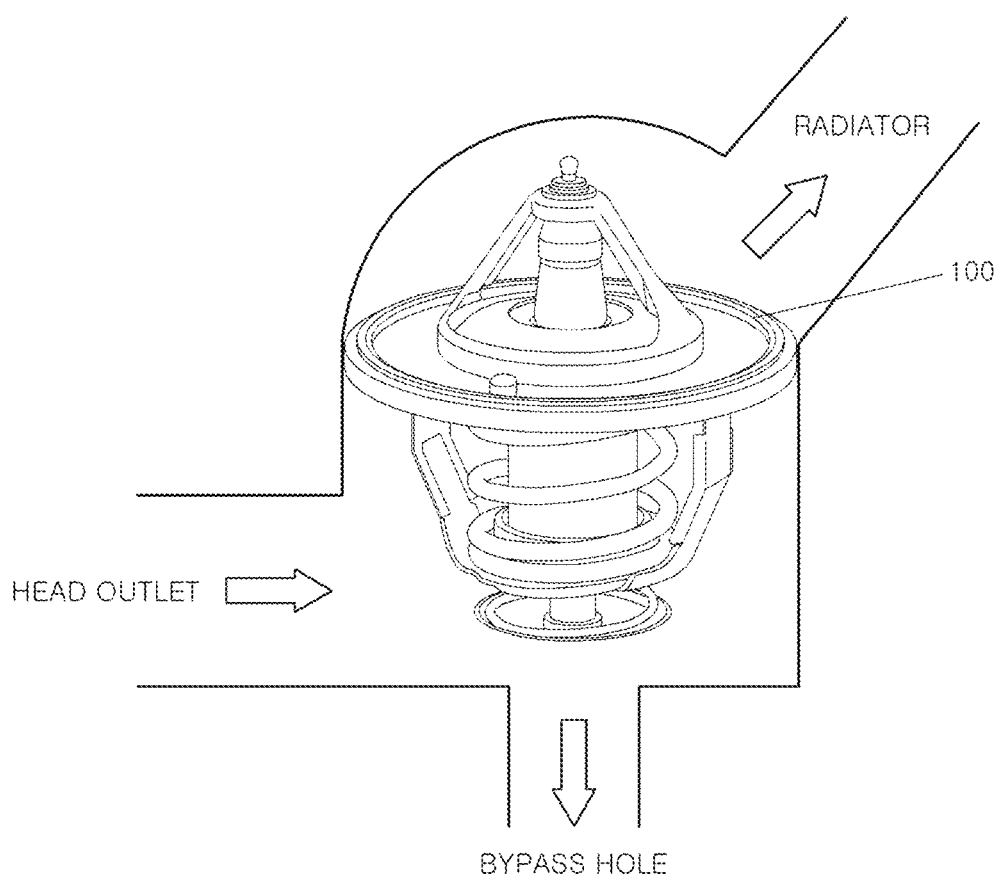

Particularly, a rotary type flow rate control valve 400 as shown in FIG. 6 may be provided instead of having the hole size varying mechanism. The flow rate control valve 400 refers to an integrated flow rate control valve in that flow rate of the coolant flowing to a plurality of components, such as a heater core of a vehicle, a radiator, and an EGR cooler, can be integratedly controlled by a single valve only.

The rotary type integrated flow rate control valve 400 shown in FIG. 6 comprises a first inlet 401 and a second inlet 402 to which the coolant is supplied and a first outlet 403 and a second outlet 405 through which the coolant is discharged. In addition, the integrated flow rate control valve 400 includes a drive motor 406 wherein the drive motor 406 rotates a rotation part 404 of the integrated flow control valve 400. As the rotary part 404 rotates, the cross-sectional areas of the inlets and outlets 401, 402, 403 and 405 are changed so that the flow rate of the coolant flowing in and out of the respective inlets and outlets, respectively, can be integratedly controlled. In the case where such a rotary type integrated flow rate control valve 400 is utilized, any one of the inlets 401 and 402 and any one of the outlets 403 and 405 may be connected to the bypass flow path, respectively, to control the bypass flow rate flowing into the thermostat. In this embodiment as well, similar to the embodiment shown in FIG. 5, a pressure measurement sensor is separately provided to derive the differential pressure of the coolant in the thermostat from pressure values measured by the pressure measurement sensor. In addition, an opening degree of the integrated flow rate control valve 400 is controlled by controlling rotation of the drive motor 406 such that the derived pressure differential is within a predetermined range.

In the case where the flow rate of the bypass flow path 130 is controlled by means of the integrated flow rate control valve 400, it is possible to integratedly control the flow rate of the coolant flowing to the heater core, the radiator, or the oil cooler. It is also possible to integratedly control the flow rate of the coolant in the bypass flow path 130 so that it is possible to reduce the number of parts that are required to control the flow rate and perform control of the flow rate more simply.

Although embodiments of the present disclosure have been described above, the present disclosure is not limited thereto. In addition, it is to be understood that those of ordinary skill in the art can easily make various changes from the embodiments of the present disclosure and thus the present disclosure covers all changes considered to be equivalent to the present disclosure.

What is claimed is:

1. An apparatus for controlling a flow rate of engine coolant by use of a thermostat, the apparatus comprising:
   a thermostat arranged in an inflow flow path for the engine coolant; and
   a flow rate regulator arranged in a bypass flow path for the engine coolant between a cylinder head of an engine and the thermostat to regulate a flow rate of the bypass flow path such that a differential pressure of the coolant between a front end for allowing the coolant flowing from a radiator to flow into the thermostat and a rear end for allowing the coolant to be discharged from the thermostat is within a predetermined range,
   wherein the flow rate regulator is a hole size varying mechanism for variably adjusting a cross-sectional area of the bypass flow path, and
   wherein the hole size varying mechanism comprises a spool cavity formed in an inner wall of the bypass flow path and a spool capable of moving linearly forward and backward along a longitudinal direction of the spool cavity and wherein the hole size is varied by the forward and backward linear movement of the spool.

2. The apparatus according to claim 1, wherein the hole size varying mechanism further comprises a valve spring mounted inside the spool cavity to apply a spring force to a front end of the spool to be inserted into the spool cavity.

3. The apparatus according to claim 2, wherein a second bypass flow path is formed extending between a flow path for the coolant flowing into the thermostat and the bypass flow path and a distal end of the spool of the hole size varying mechanism is mounted in the second bypass flow path such that the spool is pressed toward the spool cavity by pressure of the coolant flowing into the second bypass flow path.

4. The apparatus according to claim 3, wherein a stopper is provided in the second bypass flow path for limiting a range in which the distal end of the spool is inserted into the inside of the second bypass flow path.

5. The apparatus according to claim 1, wherein the thermostat comprises a first flow path connected to the radiator, a second flow path connected to a water pump, and a third flow path connected to the bypass flow path.

6. The apparatus according to claim 5, wherein: a confluence space connected to the first, second, and third flow paths is formed inside the thermostat; a valve body is mounted in the confluence space; and the thermostat is an electronic thermostat comprising, in the inside of the valve body, a drive valve arranged to open and close the flow path of the coolant, a spring for elastically supporting a lower end of the drive valve in an upward direction, and an electric-driven heater for applying heat to wax to drive the drive valve.

7. The apparatus according to claim 5, wherein the thermostat is a mechanical thermostat configured to open and close the flow path of the coolant by an expanding force of wax contracting or expanding depending on temperature of the coolant.

8. The apparatus according to claim 1, wherein the flow rate regulator is configured to regulate a bypass flow rate such that the differential pressure of the coolant is 1.4 bar or less.

9. The apparatus according to claim 1, wherein the flow rate regulator is a flow rate control valve for controlling the flow rate of the coolant in the bypass flow path in response to a result of measurement of a coolant differential pressure sensor.

10. The apparatus according to claim 1, wherein the flow rate regulator is an integrated flow rate control valve for integratedly controlling a plurality of coolant flow paths and wherein the integrated flow rate control valve controls the flow rate of the coolant in the bypass flow path as one of the plurality of coolant flow paths in response to a result of measurement of a coolant differential pressure sensor.

11. A method for controlling a flow rate of coolant flowing into an engine by use of a thermostat arranged in a coolant inflow flow path of the engine, the method comprising:
   regulating a bypass flow rate of the coolant between a cylinder head of the engine and the thermostat such that a differential pressure of the coolant between a front end for allowing the coolant flowing from a radiator to flow into the thermostat and a rear end for allowing the coolant to be discharged from the thermostat is within a predetermined range
   wherein the bypass flow rate is regulated by adjusting a cross-sectional area of the bypass flow path, and
   wherein the cross-sectional area of the bypass flow path is adjusted by forward and backward linear movement of a spool capable of moving linearly forward and backward along a longitudinal direction of a spool cavity formed in an inner wall of the bypass flow path.

* * * * *